United States Patent
Folchert et al.

(10) Patent No.: US 9,829,248 B2
(45) Date of Patent: Nov. 28, 2017

(54) DRYER CIRCUIT FOR A PNEUMATIC REGULATING DEVICE OF A VEHICLE

(75) Inventors: Uwe Folchert, Lauenau (DE); Dierk Hein, Wedemark (DE); Christian Witala, Hannover (DE)

(73) Assignee: Continental Teves AG & Co. oHG (DE)

(*) Notice: Subject to any disclaimer, the term of this patent is extended or adjusted under 35 U.S.C. 154(b) by 782 days.

(21) Appl. No.: 14/002,194

(22) PCT Filed: Feb. 23, 2012

(86) PCT No.: PCT/EP2012/053085
§ 371 (c)(1),
(2), (4) Date: Nov. 15, 2013

(87) PCT Pub. No.: WO2012/116923
PCT Pub. Date: Sep. 7, 2012

(65) Prior Publication Data
US 2014/0059876 A1  Mar. 6, 2014

(30) Foreign Application Priority Data

Mar. 1, 2011 (DE) .......... 10 2011 004 896
Sep. 28, 2011 (DE) .......... 10 2011 083 614

(51) Int. Cl.
*F26B 3/00* (2006.01)
*F26B 19/00* (2006.01)
(Continued)

(52) U.S. Cl.
CPC .......... *F26B 19/00* (2013.01); *B60G 17/0155* (2013.01); *B60G 17/0523* (2013.01);
(Continued)

(58) Field of Classification Search
CPC ........ F26B 19/00; F15B 21/048; F15B 21/04; B60G 17/0155; B60G 17/0523;
(Continued)

(56) References Cited

U.S. PATENT DOCUMENTS 6,354,617 B1   3/2002   Behmenburg et al.
7,255,358 B2   8/2007   Kim
(Continued)

FOREIGN PATENT DOCUMENTS

DE   199 18 157   4/1999
DE   199 59 556   12/2000
(Continued)

OTHER PUBLICATIONS

International Search Report corresponding to PCT/EP2012/053085 dated Apr. 5, 2012.

*Primary Examiner* — John McCormack
(74) *Attorney, Agent, or Firm* — RatnerPrestia

(57) ABSTRACT

A dryer circuit for a pneumatic regulating device of a vehicle, comprising an air dryer, and a first compressor, wherein the first compressor is designed to compress system air present in the pneumatic regulating device, wherein the air dryer, the first compressor and subsystems, which can be connected to the first compressor, of the pneumatic regulating device are arranged in such a way that, in the operating mode of a closed air supply, air delivered between the components of one of the subsystems by the first compressor is delivered so as to bypass the air dryer.

6 Claims, 6 Drawing Sheets

(51) Int. Cl.
    *B60G 17/015*     (2006.01)
    *B60G 17/052*     (2006.01)
    *F15B 21/04*     (2006.01)

(52) U.S. Cl.
    CPC ............ *F15B 21/04* (2013.01); *F15B 21/048* (2013.01); *B60G 2202/412* (2013.01); *B60G 2202/415* (2013.01); *B60G 2202/416* (2013.01); *B60G 2500/204* (2013.01); *B60G 2500/205* (2013.01); *B60G 2500/2014* (2013.01)

(58) Field of Classification Search
    CPC ...... B60G 2500/2014; B60G 2500/205; B60G 2500/204; B60G 2202/415; B60G 2202/412; B60G 2202/416; B60G 17/0152
    USPC ............ 34/72, 79, 467, 474; 280/5.5, 5.502, 280/5.504, 5.506, 5.512, 5.513, 5.514, 280/5.515, 6.15, 6.151; 701/37, 38
    See application file for complete search history.

(56) References Cited

U.S. PATENT DOCUMENTS

| | | | |
|---|---|---|---|
| 7,484,747 B2 * | 2/2009 | Geiger | B60G 17/0155 280/124.157 |
| 7,617,031 B2 * | 11/2009 | Li | B60G 17/0155 180/337 |
| 8,448,951 B2 * | 5/2013 | Hein | B60G 17/0523 280/124.16 |
| 2001/0004443 A1 | 6/2001 | Behmenburg et al. | |
| 2002/0136645 A1 | 9/2002 | Folchert et al. | |
| 2003/0047853 A1 * | 3/2003 | Behmenburg | B60C 23/10 267/64.28 |
| 2003/0107191 A1 | 6/2003 | Romer et al. | |
| 2005/0031476 A1 | 2/2005 | Antufjew et al. | |
| 2006/0043691 A1 | 3/2006 | Geiger | |
| 2009/0032158 A1 * | 2/2009 | Rudolf | B60C 23/003 152/415 |
| 2010/0063689 A1 * | 3/2010 | Hein | B60G 17/0155 701/49 |
| 2011/0316248 A1 | 12/2011 | Hein | |

FOREIGN PATENT DOCUMENTS

| | | |
|---|---|---|
| DE | 101 60 972 | 12/2001 |
| DE | 103 14 570 | 10/2004 |
| DE | 10 2005 028 328 | 12/2006 |
| DE | 10 2008 023 594 | 11/2009 |
| DE | 10 2008 034 240 | 1/2010 |
| DE | 10 2009 003 472 | 8/2010 |
| EP | 1 234 447 | 9/2002 |
| EP | 1 536 956 | 4/2008 |
| WO | WO 02/095226 | 11/2002 |

* cited by examiner

DRYER CIRCUIT FOR A PNEUMATIC REGULATING DEVICE OF A VEHICLE

CROSS REFERENCE TO RELATED APPLICATIONS

This application is the U.S. National Phase Application of PCT International Application No. PCT/EP2012/053085, filed Feb. 23, 2012, which claims priority to German Patent Application No. 10 2011 004 896.0, filed Mar. 1, 2011 and German Patent Application No. 10 2011 083 614.4, filed Sep. 28, 2011, the contents of such applications being incorporated by reference herein.

FIELD OF THE INVENTION

The invention relates to a dryer circuit for a pneumatic regulating device of a vehicle.

BACKGROUND OF THE INVENTION

The existing prior art for pneumatic regulating devices of a vehicle is given by the following publications: DE 10 2009 003 472 A1, EP 1 243 447 B1, DE 101 60 972 C1, U.S. Pat. No. 7,255,358 B2, EP 1 536 956 B1, DE 199 18 157 C1, EP 1395754A1, DE 20102436U1, DE 102008023594A1, DE 103 14 570 A1, DE 10 2008 034 240 A1, each of these publications are incorporated herein by reference.

SUMMARY OF THE INVENTION

Given the above, it is the underlying aim of an aspect of the invention to provide an improved device for a pneumatic regulating device of a vehicle with optimized switching of the air dryer.

Aspects of the invention are achieved by means of the features of the independent patent claim. Preferred embodiments of the invention are given in the dependent patent claims.

A dryer circuit for a pneumatic regulating device of a vehicle, comprising
an air dryer,
a first compressor,
wherein the first compressor is designed to compress system air present in the pneumatic regulating device, wherein the air dryer, the first compressor and subsystems, which can be connected to the first compressor, of the pneumatic regulating device are arranged in such a way that, in the operating mode of a closed air supply, air delivered between the components of one of the subsystems by means of the first compressor is delivered so as to bypass the air dryer, is provided.

The subsystems that can be connected to the first compressor can be subsystems having components such as a pneumatic actuator system, a compressed air reservoir, a drying system, a valve system or other components of a pneumatic regulating device, for example.

If the components of a subsystem that can be connected to the first compressor are, for example, a pneumatic actuator system and a compressed air reservoir, the dryer circuit described could have the advantage that there is no flow through the air dryer during regulating operations in the operating mode of a closed air supply. During regulating operations comprising "raising the vehicle" and "lowering the vehicle", no drying of the air would take place. The two regulating operations would thus be more efficient and effective.

In the operating mode of a closed air supply (GLV), the compressed air that is no longer required in the pneumatic actuator system is, in contrast to the operating mode of an open air supply (OLV), not discharged into the ambient air via an environment valve, when, for example, the vehicle body is to be lowered, but is transferred back to a compressed air reservoir from the pneumatic actuator system with the aid of a compressor. Thus, compressed air is transferred from the compressed air reservoir into the air springs with the aid of the compressor when the body of the vehicle is to be raised again, even in a closed level-regulating system, for example.

According to one embodiment of the invention, the dryer circuit comprises a second compressor, wherein:
the air dryer is arranged between the first and the second compressor,
the second compressor is designed so that, in the operating mode of an open air supply, it compresses newly supplied air from an external environment to a first, lower pressure level and delivers this compressed air through the air dryer into the first compressor as dried air, and
the first compressor is designed to compress the dried air to a second, higher pressure level and to deliver it onward to the subsystems of the pneumatic regulating device which are connected to the first compressor.

This can have the advantage that air newly supplied from an external environment during the filling of subsystems of a pneumatic regulating device of a vehicle flows through the air dryer at a low speed, ensuring that there is no entrainment of moisture with the air flow in the inlet region of the air dryer during the drying of the newly supplied air and hence there is no formation of dead zones in the air dryer.

In this context, dead zones should be taken to mean regions within the air dryer which are not used actively to adsorb moisture.

According to one embodiment of the invention, a first check valve arranged on an outlet side of the first compressor is designed to prevent the air compressed to the second pressure level from flowing back into the first compressor.

Preventing the air from flowing back into the first compressor can have the advantage that the pumping capacity of the first compressor is not impaired by any air flowing back.

This means that the two-stage compressor system with an interposed air dryer and check valve on the outlet side of the second compressor can form a versatile center piece of a regulating device, of virtually any desired design, for a vehicle or of some other kind of compressed air regulating unit or compressor unit.

According to one embodiment of the invention, a first subsystem of the subsystems comprises a dryer valve, wherein the dryer valve is arranged between the first check valve and the air dryer.

This can have the advantage that it is possible, by changing the operating state of the dryer valve, precisely to control in which phase of the respective operating mode of the pneumatic regulating device the air dryer is used and in which phase it is not used. The opened operating state of the dryer valve thus defines a clear time interval for the regeneration of the air dryer. The closed operating state of the dryer valve, in turn, defines in which time windows or in which operating phases of the regulating device the air dryer is not to be regenerated with air. This can have the advantage that the air dryer is used less in total during the overall life of a regulating device, thereby extending the effective life of the air dryer. Owing to the regulation of the use of the air dryer, the air dryer also has a permanently higher efficiency in terms of the functionality and operation thereof during its life.

According to one embodiment of the invention, the dryer circuit furthermore comprises an environment valve, wherein the environment valve is arranged between the second compressor and the air dryer and is designed to enable a switchable air path between the air dryer, the second compressor and the environment.

In the opened operating state thereof, the environment valve enables air from the air dryer or air which has been pumped into the opened environment valve by the second compressor to be discharged to the external environment of the regulating device. In the opened operating state of the environment valve, on the other hand, air can also be allowed into the regulating device from the external environment. The environment valve thus serves both for venting of and air admission to the regulating device, wherein there is a continuous exchange with the ambient air and the air dryer is involved.

During the process of venting, the warm air enriched with moisture from the desiccant flowing out of the air dryer during the regeneration of the air dryer passes through the opened environment valve and is then discharged to the environment. During the process of air admission, the air flowing in from the external environment is dried as it passes through the air dryer.

The air path, which can be switched by the environment valve, between the air dryer, the second compressor and the environment can have the advantage that there is flow through the air dryer only when either air is being discharged to the environment or when the air is being drawn in from the environment. The respective operating state of the environment valve can thus also be used to determine when the air dryer is being used and when it is not being used. Thus, the air dryer is, in turn, spared in terms of the use thereof, and the life thereof is extended.

According to one embodiment of the invention, a second subsystem of the subsystems comprises a pneumatic actuator system having a first opening valve arranged upstream of the pneumatic actuator system, a compressed air reservoir and a second opening valve arranged upstream of the compressed air reservoir, wherein the first and second opening valves are connected to one another by an air path and to the first check valve.

The switchable air path within the second subsystem makes it possible, for example, for the air compressed to the second, high pressure level by the first compressor to flow into the pneumatic actuator system or into the compressed air reservoir or, in the opposite direction, in each case to flow out again in the direction of other subsystems, depending on the operating state of the opening valve of the pneumatic actuator system or of the compressed air reservoir, wherein the first check valve in each case prevents the air from flowing back or in to the first compressor.

This can have the advantage that the operating state of the opening valves, which can be controlled by means of pressure sensors, can be used to define the following different operating phases, for example:

1. filling of the pneumatic actuator system when the opening valve of the pneumatic actuator system is open and when the opening valve of the compressed air reservoir is closed (even with dried air from the external environment) to raise the vehicle;
2. closing the opening valve of the pneumatic actuator system and opening the opening valve of the compressed air reservoir if the pressure buildup in the pneumatic actuator system is too great;
3. discharging air from the pneumatic actuator system when the opening valve of the pneumatic actuator system is open and when the opening valve of the compressed air reservoir is open or the dryer valve in the first subsystem is open to lower the vehicle;
4. venting of the second subsystem of the regulating device when the opening valve of the pneumatic actuator system is open, the opening valve of the compressed air reservoir is open, the dryer valve is open and the environment valve of the first subsystem is open.

According to one embodiment of the invention, the second subsystem of the subsystems is provided for operation in the operating mode of closed air supply and comprises a pneumatic actuator system having an upstream opening valve, a compressed air reservoir and a switchover valve, wherein the switchover valve is designed to adopt a first and a second operating state, wherein, in the first operating state, an air flow is allowed exclusively in the direction from the pneumatic actuator system to the compressed air reservoir while bypassing the air dryer and, in the second operating state, an air flow is allowed exclusively in the direction from the compressed air reservoir to the pneumatic actuator system, likewise while bypassing the air dryer.

Thus, a circuit for a pneumatic regulating device is made possible in which, both in the GLV regulating operation comprising "air delivery from the pneumatic actuator system to the compressed air reservoir" and in the GLV regulating operation comprising "air delivery from the compressed air reservoir to the pneumatic actuator system", the air dryer is bypassed and, at the same time, a compressor is also used in both regulating operations. By switching between two possible operating states of a switchover valve arranged between the pneumatic actuator system, the compressed air reservoir and the compressor, it is possible to switch backward and forward between the two GLV regulating operations, wherein the same components of the circuits are used in both regulating operations, namely only the pneumatic actuator system, the compressed air reservoir, the switchover valve and a compressor. In both GLV regulating operations, the air dryer is not used at all.

The non-use of the air dryer in both GLV regulating operations can have the advantage that compressed air does not flow unnecessarily through the air dryer but only does so in the regeneration, air admission and venting phase of the system. Thus, it is possible to provide separate time intervals in which the air dryer can regenerate completely and without being burdened by other functional operations. The geometry of the air dryer can therefore be optimally designed for the basic functions thereof: drying and regeneration. At the same time, the construction of the air dryer can be simplified. Moreover, the pipe cross sections can be made smaller. The number of leakage points is reduced. The performance of the GLV regulating operations of the pneumatic regulating device is improved.

In the calculation of the air quantity for the purpose of determining the other operating parameters during the two GLV regulating operations, the volume of the air dryer does not have to be taken into account. This is because the air dryer is physically separated from the system during the GLV regulating operations and is only connected up temporarily in the case of air admission.

By virtue of the fact that the dryer circuit involved provides for the use of a compressor in both GLV regulating operations, the air quantity present in the compressed air reservoir can be used more efficiently than before. It is not necessary, as hitherto, to keep the pressure in the compressed air reservoir higher than in the pneumatic actuator system.

One embodiment of the invention further comprises a second and a third check valve, wherein the second check valve is arranged between the switchover valve and the first compressor, and the third check valve is arranged between the first compressor and the air dryer, wherein the third check valve is arranged in such a way that an air flow is allowed between the switchover valve and the first compressor while bypassing the third check valve.

The arrangement of the second check valve between the switchover valve and the first compressor can have the advantage that the air flow in the first operating state of the switchover valve is delivered exclusively in the direction from the pneumatic actuator system to the compressed air reservoir and, in the second operating state of the switchover valve, exclusively in the direction from the compressed air reservoir to the pneumatic actuator system, since it does not allow any return flow. The air is delivered selectively in one direction, thus considerably increasing the efficiency of the two GLV regulating operations of the pneumatic regulating device.

The arrangement of the third check valve in such a way that an air flow is made possible between the switchover valve and the first compressor while bypassing the third check valve prevents air from flowing into the air dryer during the regulating operations in the GLV mode. During the two regulating operations, no drying of the air takes place. The regulating operations comprising "raising the vehicle" and "lowering the vehicle" are thus more efficient and effective.

According to one embodiment of the invention, the second and the third check valve are designed to allow an air flow exclusively in the direction of the first compressor.

The functioning of the second check valve so as to allow an air flow exclusively in the direction of the first compressor can have the advantage that, once the maximum intake volume has been reached in the GLV mode, it cannot be reduced again by air flowing back.

The second check valve thus effects an increase in the suction capacity of the second compressor.

The functioning of the third check valve so as to allow an air flow exclusively in the direction of the first compressor can have the advantage that the suction power of the first compressor is boosted further by the fact that no air can flow back into the air dryer either. To this extent, the third check valve also effects an increase in the suction power of the first compressor.

Both check valves thus have a positive synergistic effect on the capacity of the first compressor, as a result of which the regulating operations in the GLV mode become more efficient and effective.

According to one embodiment of the invention, the switchover valve is designed as a 4/2-way valve or as a combination of two 3/2-way valves.

Designing the switchover valve as a 4/2-way valve can have the advantage that it is possible to achieve two separate air flows, each flowing in opposite directions, between the pneumatic actuator system and the compressed air reservoir with a minimum use of materials by means of just two different operating states and four available ports.

Designing the switchover valve as a combination of two 3/2-way valves can have the advantage that the technical implementation of switching over between the two GLV regulating operations comprising "air delivery from the pneumatic actuator system to the compressed air reservoir" and "air delivery from the compressed air reservoir to the pneumatic actuator system" can be made considerably easier. It is technically easier to control two 3/2-way solenoid valves than one 4/2-way solenoid valve.

According to one embodiment of the invention, the environment valve is electrically or pneumatically operated.

Opening and closing of the environment valve can be accomplished pneumatically by means of pressure sensors and corresponding actuators or electromagnetically.

This can have the advantage that manual actuation of the environment valve is superfluous. Electromagnetic switching of the environment valve or autonomous switching controlled by pressure sensors increases the certainty of guaranteed operation of the environment valve as regards the changeover between the two operating states thereof.

The embodiments of the invention could provide a pneumatic regulating device for a vehicle having the following advantages as regards the configuration of an air dryer in a pneumatic regulating device, in which, for example:

for the operating mode of a closed air supply (GLV) and for the operating mode of an open air supply (OLV), no additional conditions of use have to be met and no compromises have to be made in the design of the air dryer, direct filling of the pneumatic actuator system with dried air from the environment is possible, there is no warm regeneration in the inlet region of the air dryer in the operating mode of open air supply, a compressor is used both during delivery of air from the compressed air reservoir to the pneumatic actuator system and during the delivery of air from the pneumatic actuator system to the compressed air reservoir, the air dryer is bypassed both during the delivery of air from the compressed air reservoir to the pneumatic actuator system and during the delivery of air from the pneumatic actuator system.

The two-stage compressor system described with an interposed air dryer and a check valve on the outlet side of the first compressor does not have to be modified in construction, arrangement and other design aspects in order to meet the various condition parameters for operation of the pneumatic regulating device for a vehicle in the operating mode of a closed, open or half-closed air supply. The two-stage compressor system described with an interposed air dryer and a check valve on the outlet side of the first compressor could, for example, form a fixed module of a pneumatic regulating device, to which any further modules of a compressed air device can be connected. In order to satisfy the different operating parameters for the various operating modes of a closed, open or half-closed air supply, it would merely be necessary to modify the operating parameters of the other connected modules or subsystems. This would facilitate not only calculation of the operating parameters by virtue of a limited number of variables but also the production process.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
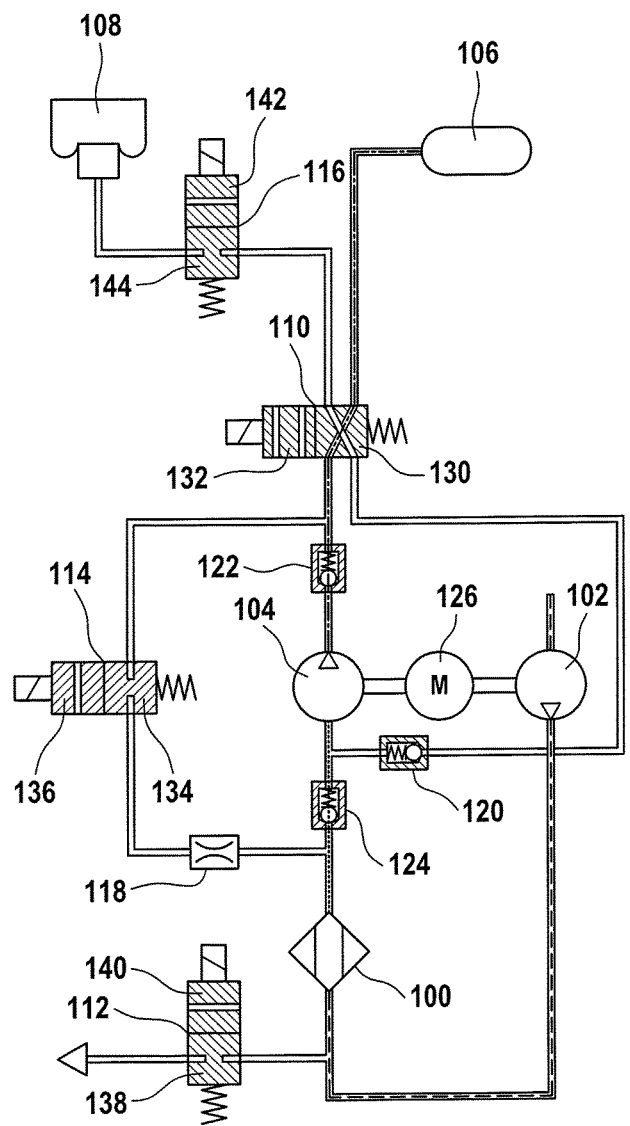
FIG. 1 shows a circuit diagram of a closed pneumatic regulating device

FIG. 1 shows a circuit diagram of a closed pneumatic regulating device, wherein the operating states of the valves involved, comprising a switchover valve 110, a dryer valve 114 and an environment valve 112, are all set so that the compressed air reservoir 106 is filled in OLV mode.

The circuit diagram shows that the air dryer 100 is connected between the second compressor 102 and the first compressor 104.

During the process of filling the compressed air reservoir 106, the second compressor 102 compresses air from the environment to a first pressure level and forces it through the air dryer 100. The first compressor 104 compresses the dried and precompressed air to the final pressure level, at which the air is passed into the compressed air reservoir 106 in operating state 130 of the switchover valve 110. In this case, the first check valve 122 prevents the air from flowing back into the first compressor 104. The third check valve 124 prevents the air from flowing back into the air dryer 100. The second check valve 120 prevents the air from flowing back in the direction of the pneumatic actuator system 108, this being assisted by the closed operating position 144 of the opening valve 116.

Thus, only air from the first, low compression stage (e.g. about 5 bar) flows through the air dryer 100 during air intake from the environment. Since compression of air in a closed system is a matter of an adiabatic change of state with an increase in the air temperature if the speed is high enough, the air temperature which is brought about by air compression after the initial compression in the compressor 102 is lower than would be the case if only single-stage compression up to the final pressure level (e.g. up to 16 bar) by means of just one single compressor present in the circuit were to take place. By virtue of the configuration claimed, in which the air flowing through the air dryer 100, which is only slightly compressed after the first compression stage, exhibits only a negligible increase in temperature, more effective use is made of the desiccant present in the air dryer 100 since the degree of adsorption of moisture by the desiccant is higher, the lower the temperature level of the air flowing through the air dryer 100. No dead zones due to an excessive inlet temperature of the air flowing through are formed in the air dryer 100.

Figure 2:
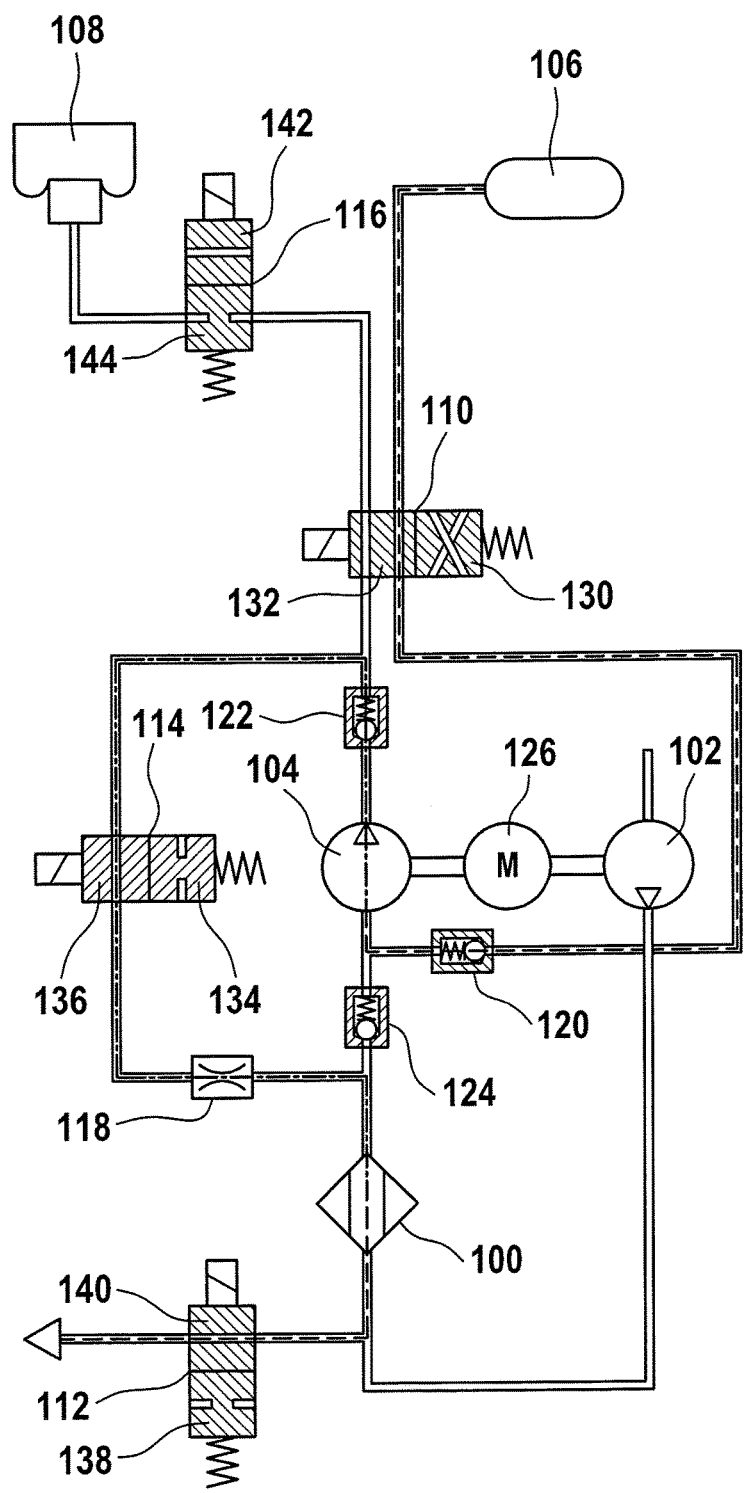
FIG. 2 shows a circuit diagram of a closed pneumatic regulating device

FIG. 2 shows the operating states in the regeneration phase of the air dryer 100 in the OLV mode. In operating state 132 of the switchover valve 110, air flows initially out of the compressed air reservoir 106 into the first compressor 104 and, with the dryer valve 114 open in operating state 136, passes through a restrictor 118 which expands the air and then into the air dryer 100 and, finally, in the opened operating state 140 of the environment valve 112, is discharged to the environment. This simultaneously corresponds to the process of venting the closed system.

The opened operating state 140 of the environment valve 112 also allows an air flow in the opposite direction, thus also allowing air to be admitted to the system from the environment. In this process, air flows from the environment, through the environment valve 112, directly into the air dryer 100, then directly into the first compressor 104.

Thus air flow through the system in both directions while excluding the pneumatic actuator system and the compressed air reservoir is possible, thereby ultimately also enabling the air dryer 100 to be regenerated.

Thus, the opened operating state of the dryer valve defines a regeneration phase of the air dryer. Here, a restrictor arranged upstream of the air dryer can reduce the air speed and reduce the pressure level to the low pressure level of the ambient air. The low pressure and the low speed of the air flow passing through the air dryer are advantageous for the regeneration of the desiccant in the air dryer since slow air flows enable the moisture to transfer from the desiccant to the air better than fast air flows. If the air is discharged immediately after use of the first compressor stages in the GLV mode, wherein the compression leads to heating of the first compressor, the air is heated as it flows through the first compressor. This is likewise advantageous for the regeneration of the desiccant in the air dryer since warm air absorbs a higher proportion of moisture than cold air. The warm and slow air flow thus absorbs the moisture from the desiccant more effectively and carries it out of the air dryer. The desiccant is now almost free from moisture again. The air dryer has thus been regenerated without being unnecessarily burdened by other operating processes.

The unambiguous determination of a time interval for the regeneration of the air dryer through the opened operating state of the dryer valve can thus also have the advantage that the regeneration process of the air dryer takes place more effectively.

Figure 3A:
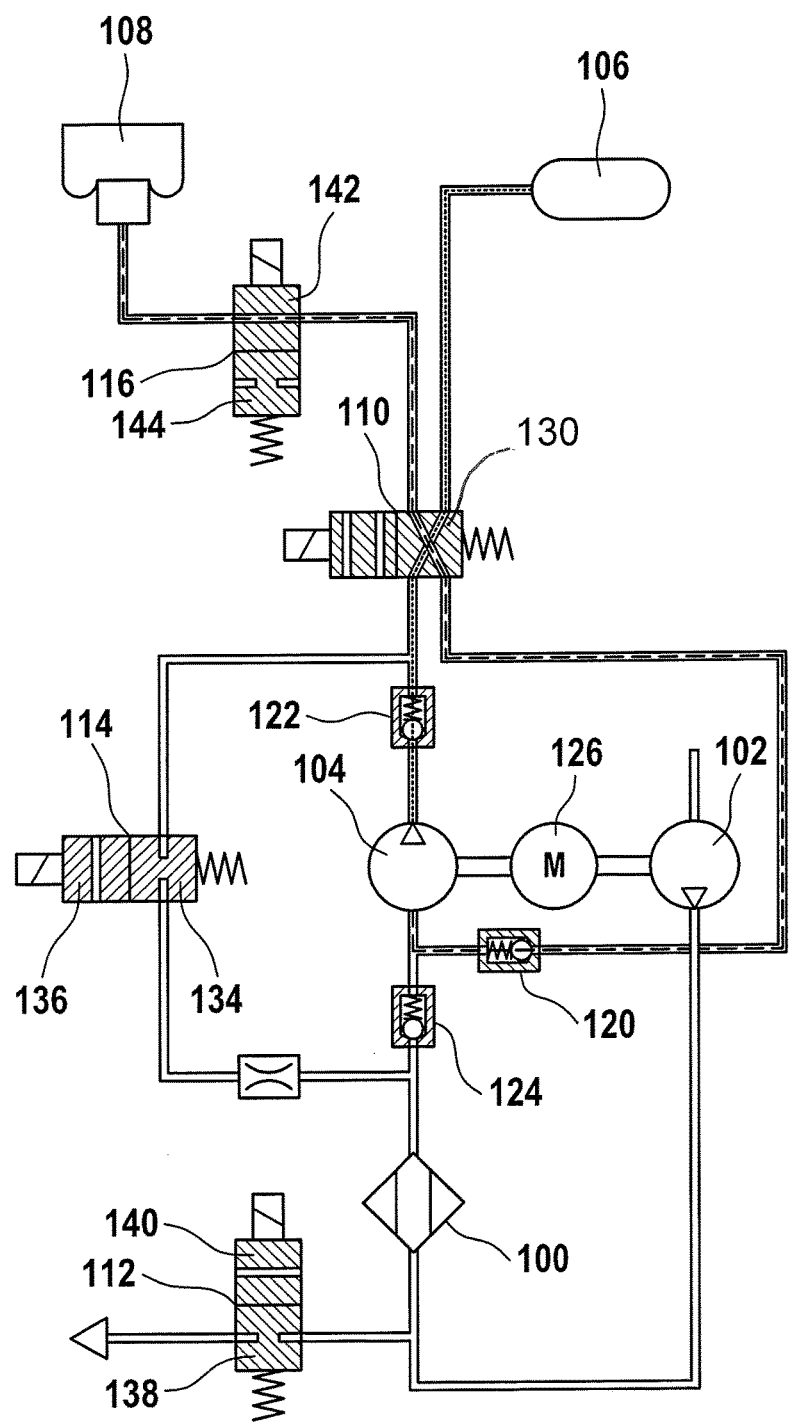
FIG. 3a shows a circuit diagram of a closed pneumatic regulating device

FIG. 3*a* shows the operating state of the pneumatic regulating device in a phase of the regulating mode, wherein, in the first operating state 130 of the switchover valve 110, the air is displaced exclusively in a direction from the pneumatic actuator system 108 to the compressed air reservoir 106 while bypassing the air dryer 100. A check valve 120, which is connected between the switchover valve 110 and the first compressor 104, prevents the air from flowing back from the first compressor 104 to the switchover valve 110. A further check valve 124, which is arranged between the air dryer 100 and the first compressor 104, prevents air from flowing into the air dryer 100. A first check valve 122, which is connected between the first compressor 104 and the switchover valve 110, prevents air from flowing back into the first compressor 104. Moreover, the dryer valve 114 is in the closed operating state 134, and therefore no air can flow into the air dryer 100.

Figure 3B:
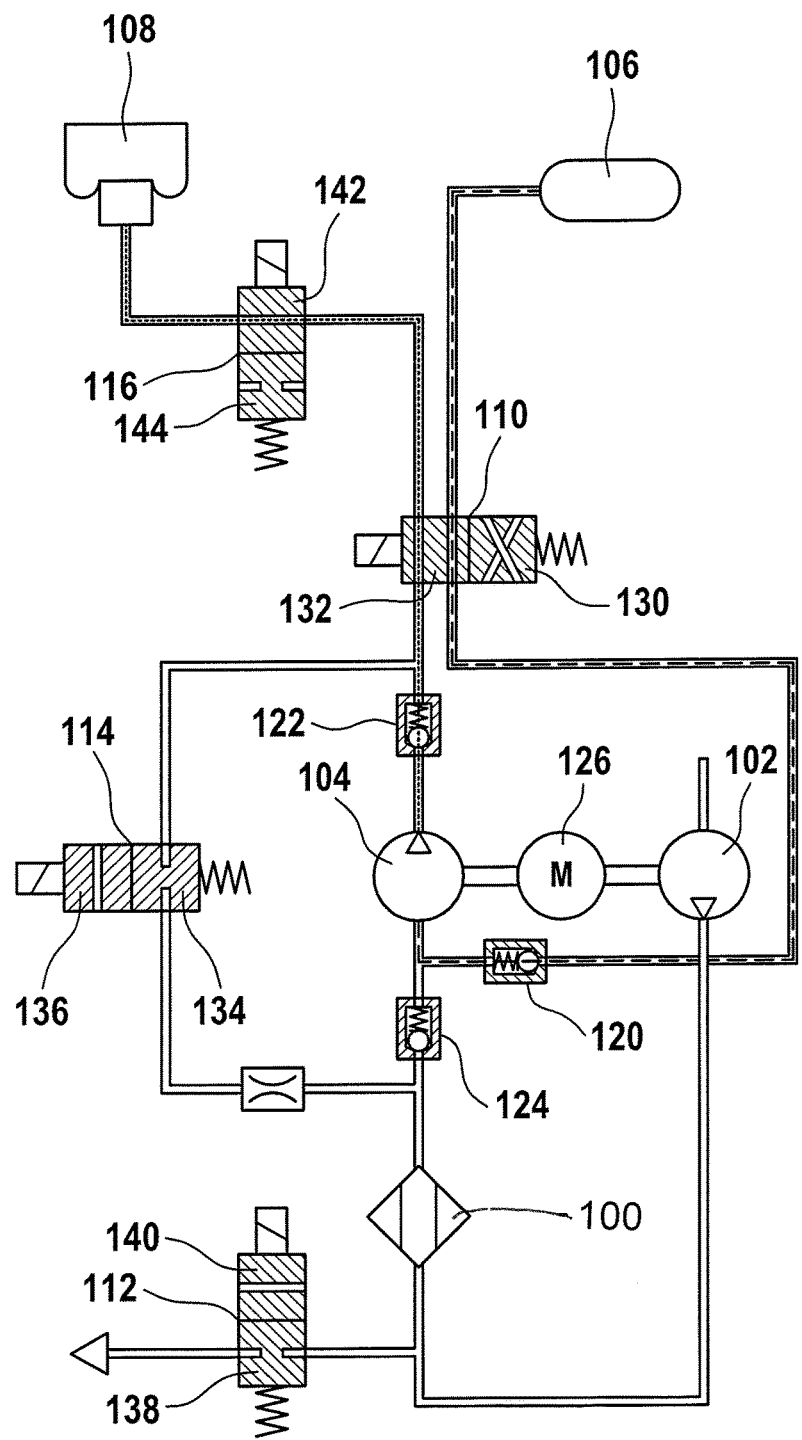
FIG. 3*b* shows a circuit diagram of a closed pneumatic regulating device

FIG. 3*b* shows the operating state of the pneumatic regulating device in a further phase of the regulating mode, wherein, in the second operating state 132 of the switchover valve 110, the air is displaced exclusively in a direction from the compressed air reservoir 106 to the pneumatic actuator system 108 while bypassing the air dryer 100. The check valve 120, which is connected between the switchover valve 110 and the first compressor 104, prevents the air from flowing back from the first compressor 104 to the switchover valve 110 in this case too. Here too, the third check valve 124, which is arranged between the air dryer 100 and the first compressor 104, prevents air from flowing into the air dryer 100. The first check valve 122, which is connected between the first compressor 104 and the switchover valve 110, prevents air from flowing back into the first compressor 104. Moreover, the dryer valve 114 is in the closed operating state 134, and therefore no air can flow into the air dryer 100.

Figure 4:
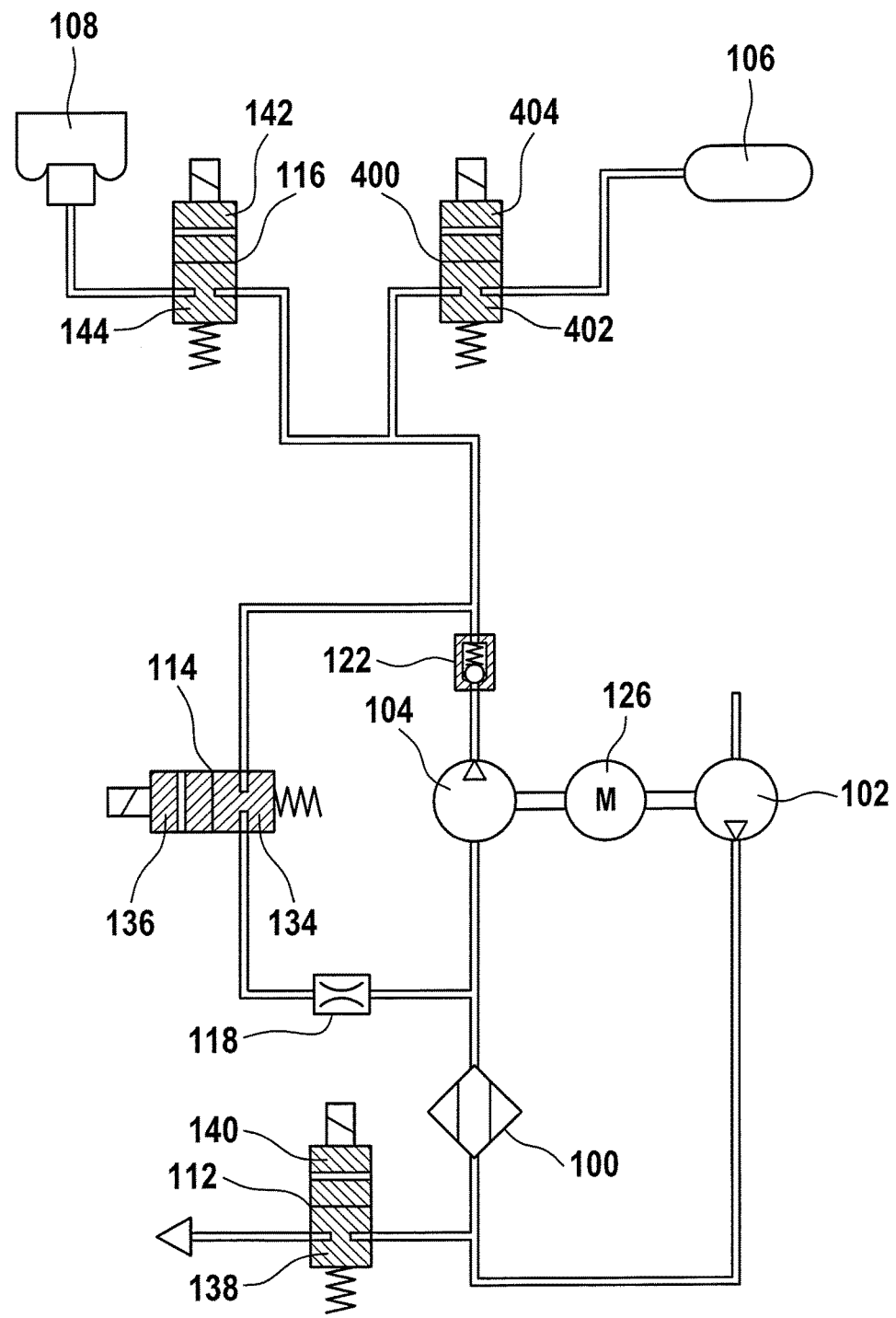
FIG. 4 shows a circuit diagram of a pneumatic regulating device in OLV mode

FIG. 4 shows the operating state of the pneumatic regulating device in the operating mode of an open air supply. The significant difference with respect to the circuit in the operating mode of closed air supply is that the switchover valve 110 is omitted. Instead of said valve, there is a simple opening valve 400 with an opened operating state 404 and a closed operating state 402. Moreover, check valves 120 and 124 are omitted.

Figure 5:
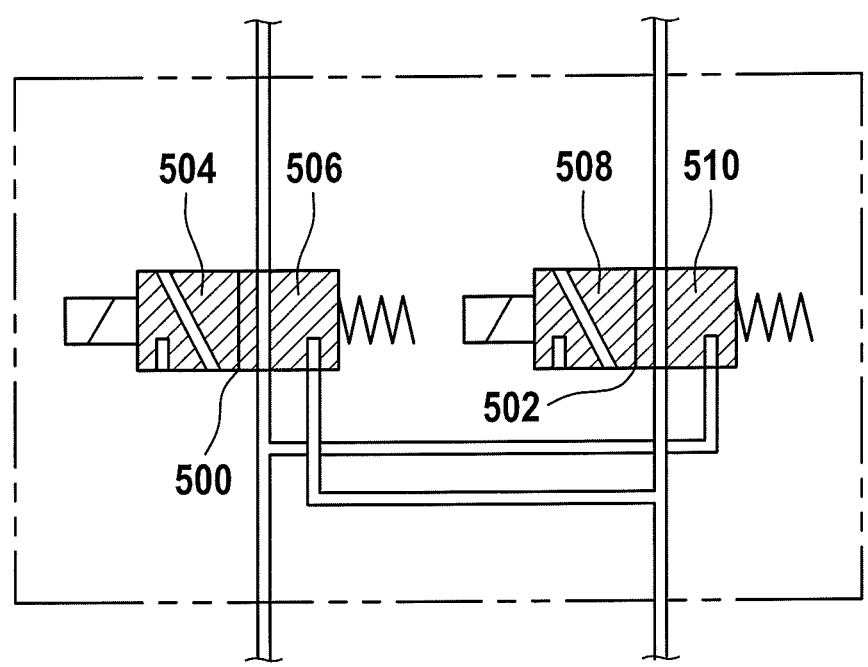
FIG. 5 shows two 3/2-way valves

FIG. 5 shows another embodiment of the switchover valve 110 in the form of a combination of two 3/2-way valves 500, 502 with their operating states 504, 506 and 508, 510, respectively, which can be used in a circuit of a pneumatic regulating device.

LIST OF REFERENCE SIGNS

100 air dryer
102 second compressor
104 first compressor
106 compressed air reservoir
108 pneumatic actuator system
110 switchover valve
112 environment valve
114 dryer valve
116 opening valve
118 restrictor
120 second check valve
122 first check valve
124 third check valve
126 motor
130 operating state
132 operating state
134 operating state
136 operating state
138 operating state
140 operating state
142 operating state
144 closed operating state of the opening valve arranged upstream of the pneumatic actuator system
500, 502 3/2-way valves
504, 506, 508, 510 operating states

The invention claimed is:

1. A dryer circuit for a pneumatic regulating device of a vehicle, comprising:
   an air dryer,
   a first compressor and a second compressor,
   wherein the first compressor is designed to compress system air present in the pneumatic regulating device, wherein the air dryer, the first compressor and subsystems, which can be connected to the first compressor, of the pneumatic regulating device are arranged in such a way that, in a closed air supply operating mode, air delivered between the components of one of the subsystems by the first compressor is delivered so as to bypass the air dryer, and wherein:
   the air dryer is arranged between an inlet side of the first compressor and an outlet side of the second compressor,
   the second compressor is designed so that, in an open air supply operating mode, the second compressor compresses newly supplied air from an external environment to a first, lower pressure level and delivers this compressed air through the air dryer into the first compressor as dried air, and
   the first compressor is designed to compress the dried air to a second, higher pressure level and to deliver it onward to the subsystems of the pneumatic regulating device which are connected to the first compressor,
   wherein a first check valve is arranged on an outlet side of the first compressor separate from the inlet side of the first compressor, and is designed to prevent the air compressed to the second pressure level from flowing back into the first compressor, and
   wherein a first subsystem of the subsystems comprises a dryer valve, wherein the dryer valve is arranged between an outlet side of the first check valve and an outlet side of the air dryer.

2. The device as claimed in claim 1, wherein a second subsystem of the subsystems comprises a pneumatic actuator system having a first opening valve arranged upstream of the pneumatic actuator system, a compressed air reservoir and a second opening valve arranged upstream of the compressed air reservoir, wherein the first opening valve and the second opening valve are connected to one another by an air path and to the first check valve.

3. The device as claimed in claim 1, wherein a second subsystem of the subsystems is provided for operation in the operating mode of a closed air supply and comprises a pneumatic actuator system having an upstream opening valve, a compressed air reservoir and a switchover valve, wherein the switchover valve is designed to adopt a first operating state and a second operating state, wherein, in the first operating state, an air flow is allowed exclusively in the direction from the pneumatic actuator system to the compressed air reservoir while bypassing the air dryer and, in the second operating state, an air flow is allowed exclusively in the direction from the compressed air reservoir to the pneumatic actuator system, likewise while bypassing the air dryer.

4. The device as claimed in claim 3, further comprising a second check valve and a third check valve, wherein the second check valve is arranged between the switchover valve and the first compressor, and the third check valve is arranged between the first compressor and the air dryer, wherein the third check valve is arranged in such a way that an air flow is allowed between the switchover valve and the first compressor while bypassing the third check valve.

5. A dryer circuit for a pneumatic regulating device of a vehicle, comprising:
   an air dryer,
   a first compressor and a second compressor, and
   first, second, and third check valves,
   wherein the first compressor is designed to compress system air present in the pneumatic regulating device, wherein the air dryer, the first compressor and subsystems, which can be connected to the first compressor, of the pneumatic regulating device are arranged in such a way that, in a closed air supply operating mode, air delivered between the components of one of the subsystems by the first compressor is delivered so as to bypass the air dryer, and wherein:
   the air dryer is arranged between the first compressor and the second compressor,
   the second compressor Is designed so that, in an open air supply operating mode, the second compressor compresses newly supplied air from an external environment to a first, lower pressure level and delivers this compressed air through the air dryer into the first compressor as dried air, and
   the first compressor is designed to compress the dried air to a second, higher pressure level and to deliver it onward to the subsystems of the pneumatic regulating device which are connected to the first compressor,
   the first check valve is arranged on an outlet side of the first compressor and is designed to prevent the air compressed to the second pressure level from flowing back into the first compressor, and the second check valve is arranged between a switchover valve and the first compressor, and the third check valve is arranged between the first compressor and the air dryer, wherein the third check valve is arranged in such a way that an air flow is allowed between the switchover valve and the first compressor while bypassing the third check valve, and wherein the second check valve and the third check valve are designed to allow an air flow exclusively in the direction of the first compressor.

6. The device as claimed in claim 3, wherein the switchover valve is designed as a 4/2-way valve or as a combination of two 3/2-way valves.

* * * * *